United States Patent
Koblbauer

(10) Patent No.: US 6,867,684 B1
(45) Date of Patent: Mar. 15, 2005

(54) METHOD FOR OPERATING A VEHICLE, AND A DEVICE FOR CARRYING OUT SAID METHOD

(75) Inventor: Michael Koblbauer, Altdorf-Pfettrach (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 09/600,335

(22) PCT Filed: Jan. 11, 1999

(86) PCT No.: PCT/EP99/00103

§ 371 (c)(1),
(2), (4) Date: Sep. 14, 2000

(87) PCT Pub. No.: WO99/36651

PCT Pub. Date: Jul. 22, 1999

(30) Foreign Application Priority Data

Jan. 14, 1998 (DE) .......................................... 198 01 064
May 27, 1998 (DE) .......................................... 198 23 707

(51) Int. Cl.[7] .............................. H04Q 1/00; H04Q 7/00; B60R 25/00; H01H 27/00

(52) U.S. Cl. ...................... 340/5.6; 340/5.22; 307/10.3; 307/10.5

(58) Field of Search .............................. 340/825.22, 5.6, 340/5.61, 5.64, 5.2, 5.21, 5.22, 5.23, 5.24, 5.25, 5.26, 5.27, 5.28, 5.72; 307/10.1, 10.2, 10.3, 10.4, 10.5, 10.6, 10.7, 10.8

(56) References Cited

U.S. PATENT DOCUMENTS

| | | | | |
|---|---|---|---|---|
| 4,159,467 A | * | 6/1979 | Ballin ........................ | 307/10.5 |
| 5,079,435 A | * | 1/1992 | Tanaka ........................ | 180/287 |
| 5,349,329 A | * | 9/1994 | Smith ........................ | 307/10.2 |
| 5,412,378 A | * | 5/1995 | Clemens .................... | 307/10.2 |
| 5,539,260 A | * | 7/1996 | Khangura et al. ........... | 340/5.6 |
| 5,552,789 A | * | 9/1996 | Schuermann .......... | 340/825.69 |
| 5,595,257 A | * | 1/1997 | Yoshida et al. ............. | 340/426 |
| 5,659,291 A | * | 8/1997 | Kennedy et al. ........... | 307/10.3 |
| 5,736,935 A | * | 4/1998 | Lambropoulos ............ | 340/457 |
| 5,793,306 A | * | 8/1998 | Vershinin et al. ...... | 340/825.69 |
| 6,064,298 A | * | 5/2000 | Zimmer ...................... | 340/426 |

FOREIGN PATENT DOCUMENTS

| | | | |
|---|---|---|---|
| DE | 32 06 434 | 9/1983 | |
| DE | 35 20 397 | 12/1986 | |
| DE | 44 21 496 | 4/1995 | |
| DE | 44 34 571 | 4/1995 | |
| DE | 44 09 559 | 6/1995 | |
| DE | 195 00 999 | 1/1996 | |
| DE | 44 28 947 | 4/1996 | |
| DE | 44 35 894 | 4/1996 | |
| DE | 195 28 099 | 2/1997 | |
| DE | 0 767 286 | 4/1997 | |
| DE | 196 15 932 | 9/1997 | |
| DE | 196 41 901 | 3/1998 | |
| DE | 196 50 048 | 6/1998 | |
| EP | 0 846 822 | 6/1998 | |
| WO | WO 9418580 A1 * | 8/1994 | ........... G01S/13/82 |
| WO | WO 97/32097 | 9/1997 | |

* cited by examiner

*Primary Examiner*—Brian Zimmerman
*Assistant Examiner*—Clara Yang
(74) *Attorney, Agent, or Firm*—Crowell & Moring LLP

(57) ABSTRACT

According to the inventive method for operating a vehicle, the authorization to access the vehicle is given in a dialogue between a control device which is fixed in the vehicle and an authorization verification device which is carried by the user. Said authorization verification device is also used to enable the vehicle drive unit to start. According to the invention, the authorization verification device is interrogated for the purpose of starting the vehicle drive unit independently of the process for establishing access authorization. The invention also relates to a device for carrying out the inventive method. The memory of said device is part of an activating unit for the vehicle drive unit.

14 Claims, 1 Drawing Sheet

METHOD FOR OPERATING A VEHICLE, AND A DEVICE FOR CARRYING OUT SAID METHOD

BACKGROUND AND SUMMARY OF THE INVENTION

The invention relates to a method for operating a vehicle and to a device for carrying out the method.

The method according to the invention is based on a method in which access authorization is determined in a dialogue between a control device, which is fixed in the vehicle, and an authorization verification device (BNE), which is carried by the user. The authorization verification device (BNE) is also used for enabling the vehicle drive unit to start.

A method of this type is known from German Patent Document DE 36 15 890 A. In that document, the dialogue between the control device and the authorization verification device (BNE) is carried out in a wireless manner. The authorization verification device is, for example, a transponder which receives an interrogation signal emitted by the control device and emits a response signal with a response code. If the user is authorized, the control device recognizes this user because of the correct response code and permits or implements the unlocking of the vehicles doors. In the case of the known method, it will then be easily possible to start the vehicle drive unit. A rotary button provided for this purpose is combined with the steering wheel lock and can easily be operated. The problem arises in this case that, for staring the vehicle drive unit, it is sufficient to unlock the vehicle. A vehicle passenger can therefore also start the operation of the vehicle drive unit if the authorized vehicle user carrying the BNE does not want him to do so.

The described problem becomes particularly serious when the access authorization is queried in a form known from German Patent Document DE 195 16 316 A. There, the question-answer dialogue is already carried out when the authorized user approaches the door handle with his hand. If he does this, for example, not with the intention of opening the vehicle door and does not recognize that the dialogue has nevertheless resulted in his identification and the vehicle is unlocked, it will then be possible for a third party to enter the vehicle and start the drive unit without the authorized user's knowledge.

In addition to the known method, it will in the future also be possible to verify the access authorization by individual body-related characteristics. An identification is known, for example, which takes place by means of finger [print or a] prints or speech recognition. Also, in the case of such a physiological authorization verification device, in the quasi automatic clearing of the vehicle drive unit known from German Patent Document DE 36 15 890 A, there is the problem of an undesired or unauthorized start of the operation of this unit.

It is an object of the invention to provide a method of the above-mentioned type in which this problem is eliminated.

The invention achieves this object by a method for operating a vehicle, in which the access authorization is determined in a dialogue between a control device, which is fixed in the vehicle, and an authorization verification device (BNE), which is carried by the user. The authorization verification device (BNE) is also used for enabling the vehicle drive unit to start. The authorization verification device (BNE) is interrogated for the purpose of starting the vehicle drive unit independently of the process for establishing access authorization.

Because the authorization to start the operation of the vehicle drive unit is now no longer coupled to a mechanical ignition key, the problem of a loss of the memory during the operation of the vehicle drive unit occurs particularly when an electronic memory is provided for the access authorization verification. This loss may be unnoticed by the authorized user; for example, the memory may be removed unnoticed from the vehicle.

The same problem occurs when the memory loses its capacity to transmit the access authorization code. For example, in the event of an electrical defect of the BNE, which occurs during the operation of the vehicle drive unit, the BNE becomes ineffective and no longer permits the subsequent start of the operation of the vehicle drive unit. This takes place, for example, if the drive unit is constructed as an internal-combustion engine, and the engine is stopped for a short time in front of a closed grade crossing.

Because the access code must be transmitted for starting the vehicle drive unit, this results in a considerable problem for the vehicle user. In order to avoid this problem, the query of the access code can also take place during and/or after the conclusion of the operation of the vehicle drive unit. The query during the operation makes it possible to rapidly detect the loss. The prerequisite is only a corresponding frequency of the query.

The query after the conclusion of the operation permits at least the taking of appropriate measures in order to then be able to start the vehicle again. The result of the query of the access code during or after the conclusion of the operation of the vehicle drive unit may be the emission of a warning signal.

With respect to the above, it is advantageous to provide in this case a vehicle-fixed memory for the access code which will then be unlocked and can, for example, also be removed from the vehicle by the user.

This memory is provided in addition to the actual memory for the access code. This redundant memory will then be operative. It may be constructed as a mechanical part which is inserted in the authorization verification device and functionally replaces the memory for the access code provided there which may be defective. The memory can then be inserted alone or together with the BNE in an activating part for the start of the operation or the operation of the vehicle drive unit. It can also be connected with a mechanical key which is then placed in an ignition lock and permits the start of the operation of the vehicle drive unit in the conventional manner.

In order to indicate to the vehicle user that the redundant memory has become effective, the vehicle user can be conspicuously informed of the implemented unlocking of the vehicle-fixed memory. This clearly reduces the danger of an accidental leaving of the redundant memory in the vehicle and the related possibility of a start of the vehicle by the unauthorized user.

If, in the process, the memory is ejected out of its receiving device, this special situation is not only clearly pointed out to the vehicle user but is also caused to pay special attention to the locking operation of the vehicle and to optionally carry out the locking conventionally, for example, by means of a mechanical key which, as a rule, is also present.

This eliminates the risk of enabling in an emergency by the measures provided for this purpose an unauthorized person to use the vehicle. The authorized user is caused to carry out the required measures (such as the removal of the redundant memory) himself.

The invention will be further explained by means of the drawings.

DETAILED DESCRIPTION OF THE DRAWINGS

Figure 1:
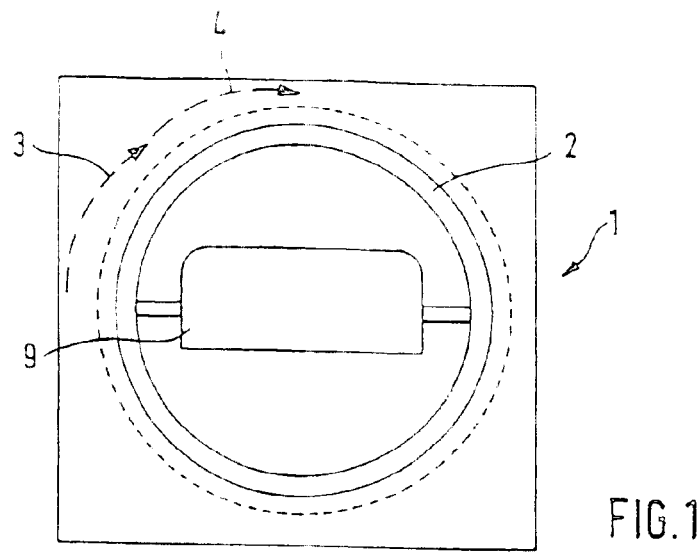
FIG. 1 is a frontal view of an activating unit for a vehicle drive unit.
Figure 2:
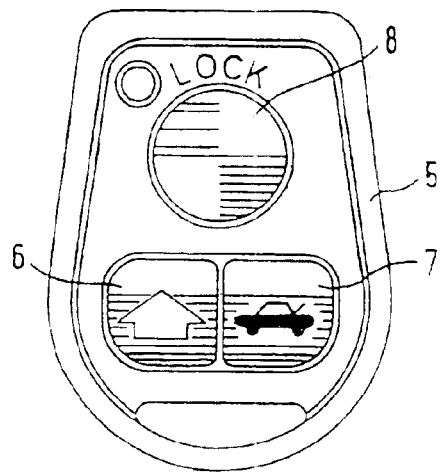
FIG. 2 is a top view of a pertaining authorization verification device.

FIG. 1 illustrates an activating unit 1 for a vehicle drive unit (not shown) by which the operation of the drive unit can be started. For this purpose, a rotatable part 2 of the unit 1 is rotated in the direction indicated by arrows 3. The successively arranged arrows 3 and 4 indicate the succession of two rotating movements by which, during the first rotating movement, the ignition circuit (not shown) of the vehicle is first closed in the conventional manner and, as a result of a further rotation (arrow 4), the starter circuit is also closed and the operation of a starter, which is also not shown, is started. As a result, the drive unit, here assumed to be an internal-combustion engine, can be started.

It is important here that for starting in the normal situation, that is, when the existing components are operating properly, the starting takes place without inserting a conventional ignition key in the activating unit 1.

In order to check the authorization for starting the operation of the drive unit, an authorization verification device 5 is provided. This device 5 contains a memory (not shown) for an access authorization code, and, in addition, is constructed in the conventional manner as a remote control signal generator. It has push buttons 6 and 7 for the remote unlocking of the central locking system (6) or of the trunk (7), as well as an additional push button 8 for emitting a remote control signal for locking the doors and the trunk of the vehicle. When the push button 6 or 7 is activated, the memory for the access authorization code is read out and emits in a known manner the authorization verification code—which also changes in a known manner with each activation corresponding to a defined algorithm and therefore ensures a protection against monitoring. The code is received by a control unit provided in the vehicle. If the code corresponds to the expected code, the corresponding remote control command is implemented.

It is also provided that a previously closed vehicle can be opened without the emission of a remote control signal. As known per se from German Patent Document DE 35 36 377 A, for this purpose, a dialogue is triggered between the control unit and the device 5 when a door handle is operated and, if the expected code is emitted by the device 5, the vehicle is unlocked and access is permitted.

For starting the operation of the drive unit, by means of the rotation of part 2 in the direction of the arrows 3 and 4, an interrogation signal is also emitted which is received by the device 5. As described above, in the case of the question-and-answer dialogue for the access, the interrogation signal is answered by the emission of the access authorization code from device 5. The control unit receives this code and, if it corresponds to the expected code, enables the ignition current and starter current circuit.

As a result, it is possible to start the vehicle without using a conventional mechanical ignition key. On the other hand, by querying the access authorization code before the start of the operation of the drive unit, it is ensured that the unit 5 is situated inside the vehicle. This ensures that the user who accessed the vehicle in an authorized manner is now most probably sitting inside the vehicle; that is, the start of the operation of the vehicle drive unit most probably is initiated by him or at least with his approval.

For the event wherein the unit 5 is removed from the vehicle or becomes inoperative after the drive unit has been started, an additional measure is provided. This measure first consists of querying the authorization code at defined points in time. This may take place when the drive unit is switched-off. However, it may also occur when the drive unit is restarted without a previous opening and closing of a vehicle door, or also at regular time intervals during the operation of the drive unit. For this purpose, the access authorization code is always queried by the control unit and, if the unit 5 is disposed inside the vehicle and is operative, the verification of the authorization and of the operability of the unit 5 is supplied by the emission of the access authorization code.

In the assumed fault cases, the access authorization code will no longer be emitted upon the query. In order to even then still ensure the proper operation of the vehicle and permit the restarting of the drive unit, an additional memory 9 is provided inside the device 1, which memory 9 also contains the access authorization code and which is locked inside the device 1. In the event of the described emergency, the locking (not shown) is eliminated. The memory 9 can therefore be removed from the device 1.

Figure 3:
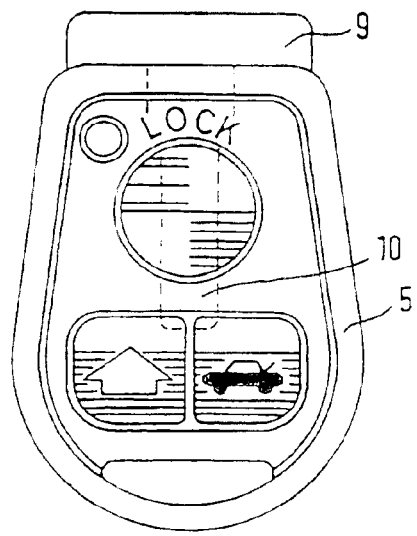
FIG. 3 is a top view of the authorization verification device of FIG. 2 supplemented by a constructional unit which permits the start of the operation of the vehicle drive unit in the event of an emergency.

The memory 9 forms a constructional unit with a mechanical key 10 which can be fitted into the unit 5. This is illustrated in FIG. 3. In this case, the memory 9 replaces the memory provided in the unit 5. This memory 9 supplies the access authorization code which is emitted by the unit 5, either by the operation of the push buttons 6 or 7 or upon the interrogation signal of the control unit.

If the power source (not shown) provided in the unit 5 is spent, a remote control signal cannot be emitted. Thus, a vehicle door can only be unlocked mechanically. This takes place in that the key 10 is pushed into a corresponding receiving device of a vehicle door lock.

Likewise, it is possible to start the drive unit in this case. For this purpose, the unit consisting of parts 9 and 10 is fitted into the device 1. Like a conventional ignition key, the key 10 is then used for permitting the starting of the operation of the drive unit by rotating the rotatable part 2. The opening and the starting of the vehicle can therefore take place conventionally at any time.

What is claimed is:

1. A method for operating a vehicle in which access authorization is determined via a dialogue between a control device fixed in the vehicle and an authorization verification device carried by a user, said authorization verification device also enabling a starting of the vehicle drive unit, wherein the control device interrogates said authorization verification device for the purpose of starting the vehicle drive unit separately and independently of the dialogue for establishing access authorization;

wherein said interrogation occurs during and/or after concluding the operation of the vehicle drive unit; and wherein if an interrogation is unsuccessful after the start of the operation of the vehicle drive unit, the method mechanically unlocks a memory fixed in the control unit of the vehicle to provide an access authorization code.

2. The method according to claim 1, further comprising the act conspicuously informing the user of the mechanical unlocking of the vehicle-fixed memory.

3. The method according to claim 2, wherein the act of conspicuously informing provides a visual and/or acoustical signal.

4. The method according to claim 2, further comprising the act of ejecting said vehicle-fixed memory from a storage location when the vehicle drive unit is switched-off.

5. The method according to claim 3, further comprising the act of ejecting said vehicle-fixed memory from a storage location when the vehicle drive unit is switched-off.

6. A method for operating a vehicle in which access authorization is determined via a dialogue between a control device fixed in the vehicle and an authorization verification device carried by a user, said authorization verification device also enabling a starting of the vehicle drive unit, wherein the control device interrogates said authorization verification device for the purpose of starting the vehicle drive unit separately and independently of the dialogue for establishing access authorization;

wherein said interrogation occurs during a start of the operation of the vehicle drive unit;

wherein the interrogation also occurs during and/or after concluding the operation of the vehicle drive unit; and wherein if an interrogation is unsuccessful after the start of the operation of the vehicle drive unit, the method mechanically unlocks a memory fixed in the control unit of the vehicle to provide an access authorization code.

7. The method according to claim 6, further comprising the act conspicuously informing the user of the mechanical unlocking of the vehicle-fixed memory.

8. The method according to claim 7, wherein the act of conspicuously informing provides a visual and/or acoustical signal.

9. A system for carrying out a method of operating a vehicle, in which access authorization is determined in a dialogue between a control device, fixed in the vehicle, and an authorization verification device carried by a user, said authorization verification device also being used for starting a vehicle drive unit, wherein said authorization verification device is interrogated for the purpose of starting the vehicle drive unit independently of said dialogue for establishing access authorization, said system comprising:

an activating unit for the vehicle drive unit, said activating unit starting the vehicle drive unit; and a vehicle-fixed memory forming a part of said activating unit for the vehicle drive unit, said vehicle-fixed memory being mechanically unlocked from the activating unit if an interrogation of said authorization verification device is unsuccessful after starting the vehicle drive unit.

10. The system according to claim 9, wherein said vehicle-fixed memory fits into the activating unit.

11. The system according to claim 10, wherein said vehicle-fixed memory fits into said authorization verification device.

12. The system according to claim 9, wherein said vehicle-fixed memory fits into said authorization verification device.

13. The system according to claim 9, wherein an access verification authorization code is extracted from said vehicle-fixed memory.

14. The system according to claim 9, wherein said vehicle-fixed memory and a mechanical key form a constructional unit that is fit into said activating unit for the vehicle drive unit.

* * * * *